(12) United States Patent
Wajs et al.

(10) Patent No.: US 7,155,611 B2
(45) Date of Patent: Dec. 26, 2006

(54) METHOD OF OPERATING A CONDITIONAL ACCESS SYSTEM FOR BROADCAST APPLICATIONS

(75) Inventors: Andrew Augustine Wajs, Haarlem (NL); Robert Fransdonk, Heemstede (NL)

(73) Assignee: Irdeto Access, B.V., Hoofddorp (NL)

( * ) Notice: Subject to any disclaimer, the term of this patent is extended or adjusted under 35 U.S.C. 154(b) by 1033 days.

(21) Appl. No.: 09/914,258

(22) PCT Filed: Dec. 18, 2000

(86) PCT No.: PCT/EP00/13394

§ 371 (c)(1),
(2), (4) Date: Feb. 8, 2002

(87) PCT Pub. No.: WO01/47271

PCT Pub. Date: Jun. 28, 2001

(65) Prior Publication Data

US 2002/0126847 A1    Sep. 12, 2002

(30) Foreign Application Priority Data

Dec. 22, 1999    (EP) .................................. 99204481

(51) Int. Cl.
*H04K 1/00*    (2006.01)
*H04L 9/08*    (2006.01)
*H04L 9/32*    (2006.01)

(52) U.S. Cl. ...................... 713/182; 380/239; 380/278; 713/163; 726/26

(58) Field of Classification Search ................ 380/233, 380/228, 241, 281, 239
See application file for complete search history.

(56) References Cited

U.S. PATENT DOCUMENTS 5,177,791 A * 1/1993 Yeh et al. ..................... 380/45

(Continued)

FOREIGN PATENT DOCUMENTS

EP    0822720 A    2/1998
WO    WO9919822    *    4/1999

OTHER PUBLICATIONS

"Functional model of a conditional access system", *EPU Technical Review*, Winter 1995, No. 266, Dec. 21, 1995, pp. 64-77.

(Continued)

*Primary Examiner*—Jacques Louis-Jacques
*Assistant Examiner*—Thomas Szymanski
(74) *Attorney, Agent, or Firm*—Schwegman, Lundberg, Woessner & Kluth, P.A.

(57) ABSTRACT

In a method for operating a conditional access system for broadcast applications, the conditional access system comprising a number of subscribers and each subscriber having a terminal including a conditional access module and a secure device for storing entitlements, a source signal is encrypted using a first key ($C_W$). The encrypted source signal is broadcasted for receipt by the terminals, wherein entitlement control messages (ECM's) are sent to the secure devices, the ECM's comprising the first keys ($C_W$) encrypted using a service key ($P_T$). Entitlement management messages (EMM's) are sent to the secure devices providing the service key ($P_T$) required to decrypt encrypted first keys ($C_W$). A cracked secure device which is used in an unauthorized manner is traced by sending different keys required to obtain the first keys to different terminals or groups of terminals and monitoring the key information provided by a pirate. To this end search EMM's are sent to at least a part of the terminals, the search EMM's providing at least the service key ($P_T$) and a dummy key ($P_{D1}$ or $P_{D2}$). At least the search EMM's comprise identifiers identifying the keys ($P_T$ and $P_{D1}$ or $P_{D2}$), wherein first search EMM's with the keys ($P_T$ and $P_{D1}$) are sent to a first part of the terminals and second search EMM's with the keys ($P_T$ and $P_{D2}$) are sent to a second part of the terminals An ECM identifying the service key ($P_T$) to be used to decrypt the encrypted first key ($C_W$), is sent to all secure devices just before the first key ($C_W$) is needed to decrypt the source signal.

7 Claims, 2 Drawing Sheets

U.S. PATENT DOCUMENTS

| | | | | |
|---|---|---|---|---|
| 5,937,067 | A | * | 8/1999 | Thatcher et al. ............ 380/212 |
| 5,991,400 | A | * | 11/1999 | Kamperman ................ 380/239 |
| 6,035,038 | A | * | 3/2000 | Campinos et al. .......... 380/228 |
| 6,091,818 | A | * | 7/2000 | Campinos et al. .......... 713/155 |
| 6,157,719 | A | * | 12/2000 | Wasilewski et al. ........ 380/210 |
| 6,393,562 | B1 | * | 5/2002 | Maillard ..................... 713/150 |
| 6,430,290 | B1 | * | 8/2002 | Van Willigen et al. ......... 380/1 |
| 6,587,561 | B1 | * | 7/2003 | Sered et al. ................ 380/241 |
| 2002/0133701 | A1 | * | 9/2002 | Lotspiech et al. .......... 713/163 |

OTHER PUBLICATIONS

"Standardization of Conditional Access Systems for Digital Pay Television", *Philips Journal of Research*, vol. 50, No. 1/2 1996, pp. 217-225.

European Search Report for EP 99 204481.

\* cited by examiner

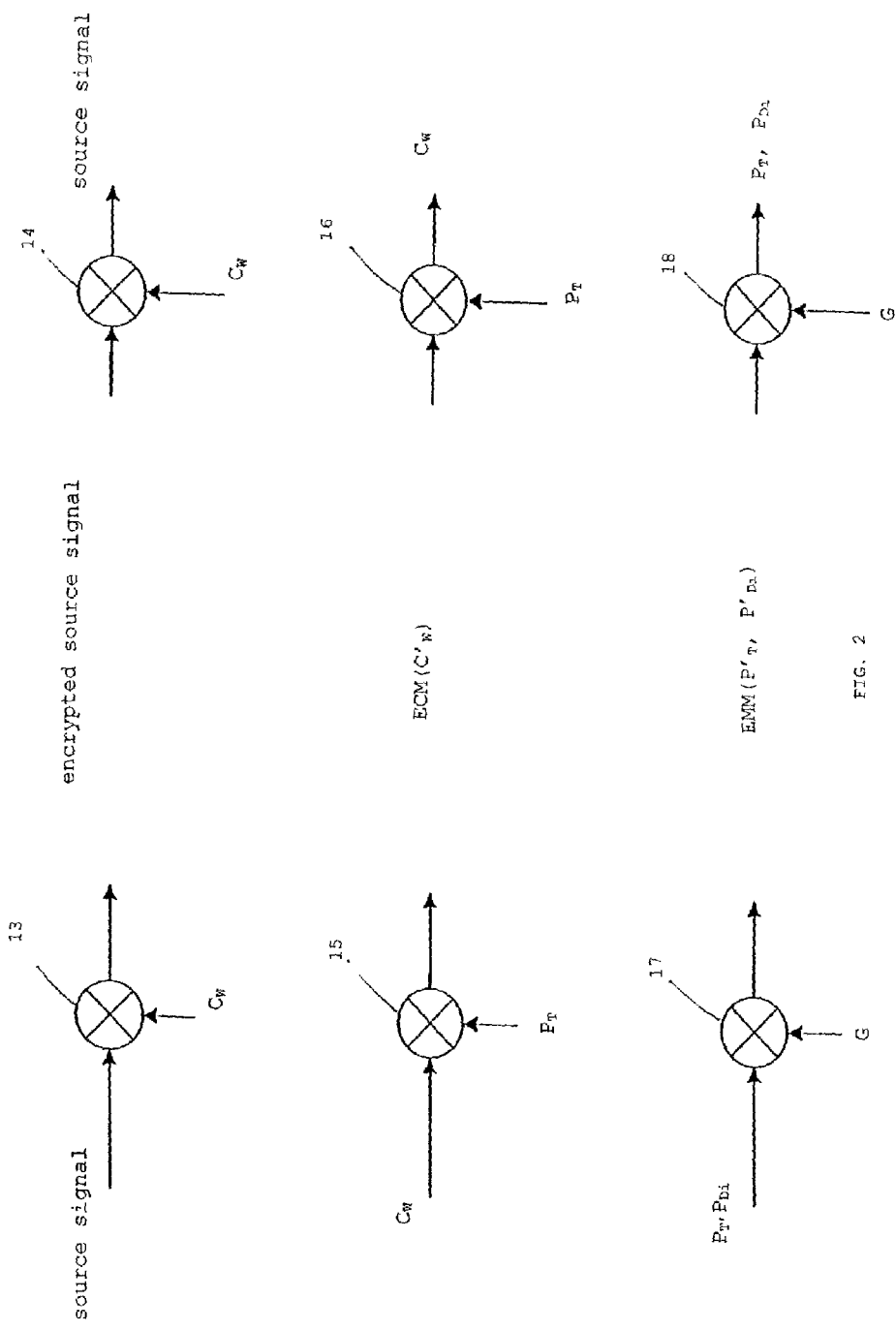

METHOD OF OPERATING A CONDITIONAL ACCESS SYSTEM FOR BROADCAST APPLICATIONS

FIELD

The disclosure relates to the field of broadcast applications, and more particularly to conditional access systems.

BACKGROUND

Conditional access systems for broadcast applications are used for example in pay television operations wherein one has to subscribe to be entitled to watch a channel, a service or an event. In view of the high numbers of subscribers and thereby high numbers of secure devices distributed among the subscribers, the secure devices are open to attack by unauthorised persons trying to extract the unique key of a secure device. The secure devices are generally provided in the form of smart cards. If an unauthorised person or pirate succeeds to extract the unique key, the smart card is cracked and the pirate is able to distribute global keys over the internet, for example the first key or service key, to set up a pirate subscriber network.

When the service provider establishes that the conditional access system has been hacked, it is necessary to trace the cracked smart card or smart cards. A known method to trace a cracked smart card is to perform a so-called binary search on the base of smart cards which have been issued. According to this known method, a false key is published to half the smart cards and a true key to the other half. The pirate will publish either the false or true key on the internet and from the key published by the pirate, it is possible to narrow down to which half of the base the cracked smart card belongs. In a next step again a false key is published to one half of this located half of the base of smart cards and a true key to the other half of the base and again it can be deduced from the key published by the pirate in which half the cracked smart card is located. By repeating these steps, the cracked smart card can be located and switched off. A disadvantage of such a binary search is that legal subscribers will continuously see blacked out screens during the time the search is performed. If such search activities are repeatedly necessary and continue for long periods, this will lead to subscriber dissatisfaction.

SUMMARY

The disclosure relates to a method for operating a conditional access system for broadcast applications, said conditional access system comprising a number of subscribers, each subscriber having a terminal including a conditional access module and a secure device for storing entitlements, wherein a source signal is encrypted using a first key ($C_W$), said first key ($C_W$) being changed at a high rate, said encrypted source signal being broadcasted for receipt by the terminals, wherein entitlement control messages (ECM's) are sent to the secure devices, said ECM's comprising the first keys ($C_W$) encrypted using a service key ($P_T$), wherein entitlement management messages (EMM's) are sent to the secure device providing the service key ($P_T$) required to decrypt encrypted first keys ($C_W$), wherein a cracked secure device which is used in an unauthorised manner is traced by sending different keys required to obtain the first keys to different terminals or groups of terminals and monitoring the key information provided by a pirate.

The invention aims to provide a method of the above-mentioned type wherein causing blacked out screens at legal subscribers is restricted as much as possible or even completely avoided.

To this end the method of the invention is characterized in that search EMM's are sent to at least a part of the terminals, said search EMM's providing at least the service key ($P_T$) and a dummy key ($P_{D1}$ or $P_{D2}$), at least the search EMM's comprising identifiers identifying the keys ($P_T$ and $P_{D1}$ or $P_{D2}$), wherein first search EMM's with the keys ($P_T$ and $P_{D1}$) are sent to a first part of the terminals and second search EMM's with the keys ($P_T$ and $P_{D2}$) are sent to a second part of the terminals, wherein an ECM identifying the service key ($P_T$) to be used to decrypt the encrypted first key ($C_W$), is sent to all secure devices just before the first key ($C_W$) is needed to decrypt the source signal.

In this manner it is obtained that at all legal subscribers, the secure device receives the identification of the service key to be used to decrypt the first key in time before the first key is needed to decrypt the source signal. Therefore there will be no blacked out screens at legal subscribers. However, when the pirate receives the identification of the service key to be used, the pirate has insufficient time to publish the correct key in advance. The delay time between the receipt of the identification of the service key to be used and the encrypted source signal to be decrypted with the first key is too short to distribute the correct key over the internet. Therefore, if the pirate does not publish all keys available to the pirate, the pirate subscribers will have blacked out screens repeatedly depending on the rate of publishing dummy keys. In view of the publishing of all keys available to the pirate, the same type of binary search as in the prior art can be applied to locate the cracked smart card.

According to a further embodiment of the method of the invention, a set of search EMM's is sent to the terminals, each search EMM providing two keys ($P_T$ and $P_{D1}$, $P_T$ and $P_{D2}$, ..., $P_T$ and $P_{Dn}$). In this manner the number of iteration steps in the binary search can be significantly reduced depending on the size of the set of search EMM's.

As an alternative embodiment, a set of search EMM's is sent to at least a portion of the terminals, each search EMM of the set comprising a different dummy key ($P_D$) and each EMM being sent to a different part of the terminals.

In this manner the cracked smart card or smart cards used by the pirate can be located in a few or even only one step so that although a blacked out screen will be seen by the legal subscribes, this will not lead to subscriber dissatisfaction.

In a further alternative embodiment of the method of the invention the encrypted source signal comprises a stream of data packets, wherein successive groups including at least one data packet, are encrypted using successive first keys ($C_{W1}, C_{W2}, \ldots, C_{Wi}, \ldots, C_{Wn}$) , each data packet having a flag indicating the first key ($C_{Wi}$) to be used for decrypting the data packet, wherein in stead of an ECM identifying the service key ($P_T$) an ECM identifying a dummy key ($P_{D1}$ or $P_{D2}$) to be used to decrypt a next encrypted first key ($C_{Wi}$) , is sent to the secure devices of the first and second parts of the terminals, respectively, just before the first key ($C_{Wi}$) is needed to decrypt the source signal, whereas the data packet is encrypted using the previous first key ($C_{Wi-1}$)

In this manner the pirate is forced to respond to the ECM by transmitting the first key decrypted by using a dummy key, to the pirate decoders. By means of this false key published by the pirate the cracked smart card can be traced. The service provider actually uses the previous first key to scramble the next data packet so that all subscribers can descramble this data packet using the previous first key which is normally still available in the decoder.

BRIEF DESCRIPTION OF THE DRAWINGS

The invention will be further explained by reference to the drawings in which an embodiment of a conditional access system for broadcast applications is shown, in which an embodiment of the method of the invention is implemented.

FIG. 2 schematically shows an example of a key hierarchy for use in the conditional access system of FIG. 1.

DETAILED DESCRIPTION

Figure 1:
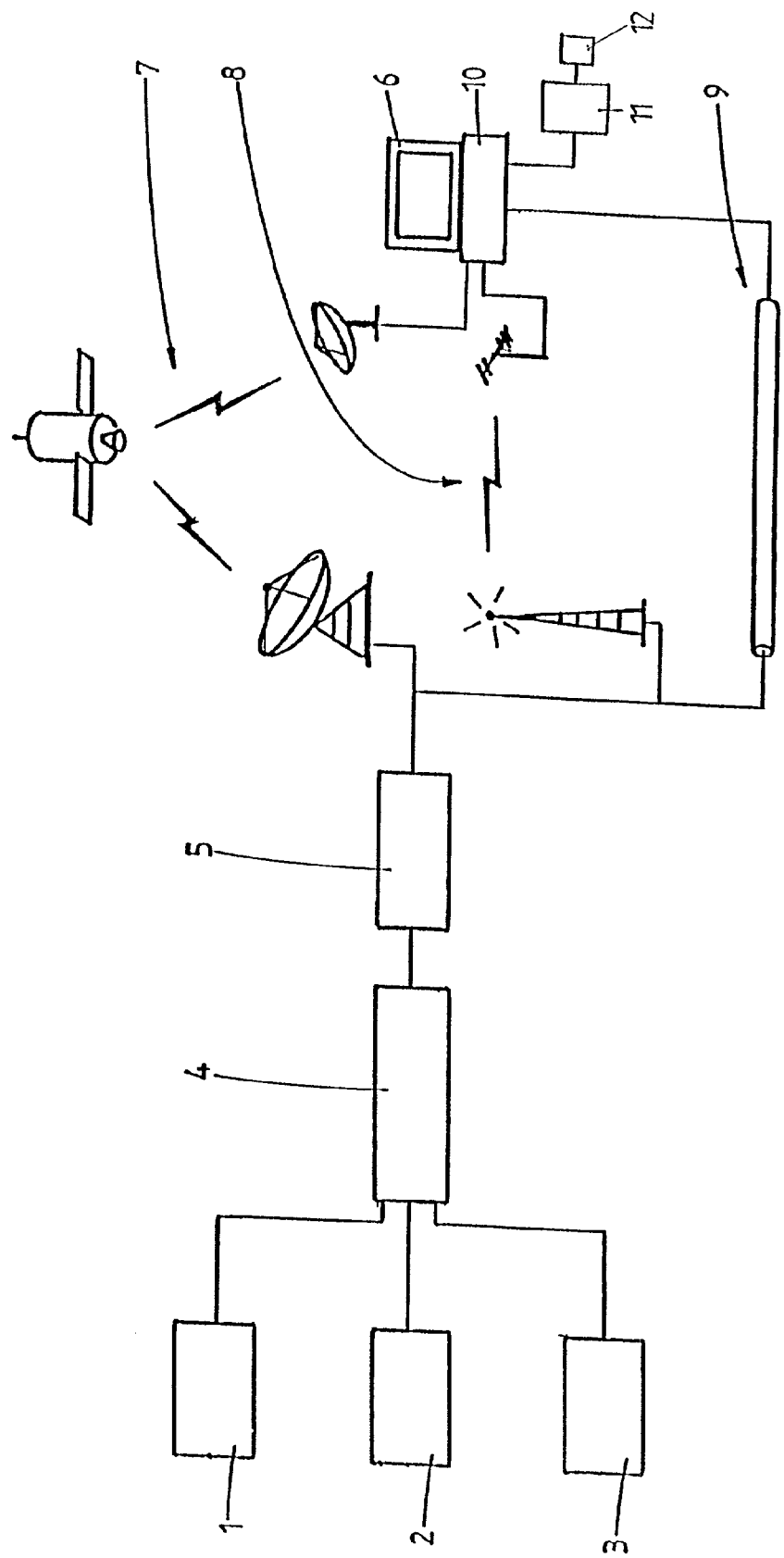
FIG. 1 schematically shows a conditional access system for broadcast applications, in which an embodiment of the method of the invention is implemented.

In the broadcasting application shown, three broadcasters 1–3 are coupled with a multiplexer unit 4 comprising means for scrambling, encoding and compressing broadcast signals provided by the broadcasters 1–3. The thus obtained digital data streams are multiplexed into a digital transport stream, for example in accordance with the MPEG-2 standard. In the embodiment shown this digital transport stream is modulated by way of a modulator 5 before transmission. The operator of the equipment including the multiplexer unit 4 and modulator 5 is responsible for transmitting the signal to the receiving equipment of the public, one television set 6 being shown by way of example. The transmission of the signal may be carried out through one or more telecommunication channels including a satellite link 7, terrestrial link 8 or a cable system 9. One or more of the broadcasters 1–3 may be private broadcasters operating according to the concept of pay television, which implies subscription. This means that people wishing to view programs broadcasted by a particular broadcaster, have to subscribe to such a broadcast, and pay the appropriate fee.

Access to anyone of the broadcast signals provided by the broadcasters 1–3 requires a terminal 10 which for the subscription requiring services includes a conditional access module 11 and a secure device 12, generally provided in the form of a smart card which can be connected to the conditional access module 11. The remaining part of the terminal 10 is known as such and needs not be described in detail.

In the broadcast application of FIG. 1, for example broadcaster 1 may be a pay television operator using a conditional access system with a number of subscribers, each subscriber having a terminal 10 with conditional access module 11 and smart card 12. Such a conditional access system may use a key hierarchy, an example of which is schematically shown in FIG. 2. The broadcaster side is shown at the left, whereas the subscriber side is shown at the right of FIG. 2. As shown the broadcaster scrambles the source signal by means of a scrambler 13, wherein the source signal is scrambled using a first key or control word $C_W$. In this manner an encrypted source signal is obtained which is multiplexed by the multiplexer 4. At the subscriber's side, the encrypted source signal is descrambled to obtain the clear source signal in a descrambler 14 using the first key $C_W$. For security reasons, the key $C_W$ is generally changed at the high rate, for example every ten seconds.

The control word or first key $C_W$ is sent to the subscribers in so-called entitlement control messages or ECM's which are scrambled as indicated by reference numeral 15 using a service key $P_T$. These scrambled ECM's are decrypted at the subscriber's side using the same service key $P_T$, as indicated by reference numeral 16. At a higher level of hierarchy the service keys are sent in so-called entitlement management messages or EMM's in a scrambled manner as indicated by reference 17 using a group key G and these scrambled EMM's are descrambled at the subscriber's side using the same group key G as indicated by reference 18. Finally, a group key can be distributed to subscribers using individual smart card keys and/or smart card addresses. It will be understood that this example of key hierarchy is described by way of non-limiting example only.

As a large number of smart cards 12 is distributed among the subscribers of broadcaster 1, these smart cards are open to attack by unauthorised persons or pirates to extract the secret individual key from the smart card. If a pirate succeeds in extracting the individual key, the pirate is able to obtain any of the keys used in the conditional access system in the clear and he can distribute keys over the internet to subscribers of his pirate network.

If the broadcaster 1 notices that one or more of his smart cards 12 have been cracked, he can start a search for the cracked smart card or smart cards in the following manner.

Instead of the usual EMM's distributing service keys $P_T$, special search EMM's are sent to the terminals 10, wherein a search EMM provides a true service key $P_T$ and a false or dummy key $P_{D1}$ to half of the subscribers and the true service key $P_T$ and a second dummy key $P_{D2}$ to the other half. Usually an EMM comprises an identifier for the service key and in the same manner the search EMM's also comprise identifiers for the keys $P_T$ and $P_{D1}$ or $P_{D2}$. Of course these search EMM's will be received both by the legal subscribers and by the pirate. A very short time before the service key $P_T$ is to be used to decrypt a control word $C_W$, an ECM is published including an identifier indicating the key to be used to decrypt the control word $C_W$, i.e. the true service key $P_T$.

The advance warning provided by the ECM comprising the identifier of the service key $P_T$, is just sufficient to decrypt the control word $C_W$ before the control word is needed to decrypt the encrypted source signal. This means that although the pirate also receives the identifier of the true service key $P_T$, there is insufficient time for the pirate at the publishing of the ECM to publish the correct key $P_T$ in advance on the internet. If the pirate does not take any further action, the pirate subscribers will have blacked out screens every few minutes of even seconds. This means that the pirate is forced to publish the keys required to decrypt the ECM in advance of the ECM being transmitted. Through publishing either dummy key $P_{D1}$ or $P_{D2}$, the pirate can be located by consecutive iteration steps as described above.

The method described shows the advantage that there will be no blacked out screens at the legal subscribers, as the smart card 12 at the legal subscribers has sufficient time to use the correct service key to descramble the control word $C_W$.

In order to restrict the number of iteration steps, a set of search EMM's could be used, wherein each search EMM of the set provides two keys, i.e. the true service key $P_T$ and a dummy key $P_{T1}$ or $P_{D2}$ or . . . $P_{Dn}$. Each EMM of the set is sent to a different group of smart cards, so that the dummy key $P_{Di}$ published immediately indicates the group of smart cards to which the cracked one belongs.

As a further complication to a pirate the following method can be applied, wherein some characteristics of an encrypted source signal are used. Generally the encrypted data stream comprises data packets, wherein each next data packet or group of data packets is scrambled using a next first key $C_{Wi}$. A header flag of the data packet or group of data packets indicates the serial number i of the first key used for scrambling so that the terminal 10 knows which of the first keys provided must be used for descrambling a data packet or group received. According to the invention an ECM is transmitted which indicates that the next key will be one of the dummy keys $P_{D1}$ or $P_{D2}$. However, the next data packet or group is scrambled using the previous first key $C_{Wi-1}$. As the pirate can not distinguish between the different keys and can not predict whether an indication to use a specific key is true or not, the pirate will be forced to publish the key descrambled using the dummy key. Through publishing this descrambled key the pirate can be located by consecutive iteration steps as described above. At the subscribers the header flag of the data packet will cause use of the control word $C_{Wi-1}$, so that normal operation of the terminal is obtained. This method can be used advantageously in case a pirate has a very fast responding system, which would allow the pirate to publish decrypted first keys only in stead of the dummy key itself.

In an alternative embodiment of the method described, a cracked secure device can be traced by using a type of cryptography, wherein it is possible to generate a set of keys, each key being capable of decrypting the same cryptogram. As an example of such type of cryptography an RSA multiple-key cryptographic algorithm or a secret-sharing algorithm can be used. As the cryptography as such is not a part of the present disclosure reference is made to the book Applied Cryptography by Bruce Schneier, in particular chapter 23, for a further explanation of this type of cryptography. For example the EMC's are encrypted using a multiple-key algorithm having a set of keys Pi capable of decrypting the EMC. Depending on the number of keys of the set and the number of terminals, each terminal or each group of terminals is provided with a different key Pi, so that if a pirate rebroadcasts the key, the source, i.e. the cracked secure device, can be traced. It is also possible to apply this special type of cryptography on the source signal, so that in stead of one control word Cw set of control words Ci is capable of decrypting the encrypted source signal.

The same result can be achieved with a secret-sharing algorithm, wherein one or more shares are required to derive the key required for obtaining the control words. By distributing different shares to different terminals or groups of terminals, the cracked secure device can be traced.

It is noted that the number of keys or shares need not to be large. By varying the grouping structure, i.e. the distribution of the terminals on the different groups, it is possible to trace the cracked secure device by monitoring the sequence of keys or shares which are rebroadcast by the pirate. It is observed that the same method of varying the grouping structure can be used in all above-described embodiments of the invention.

If it is deemed acceptable that legal subscribers will have a very restricted number of blacked out screens during a search for a cracked smart card, the following method could be used. A special set of search EMM's is distributed to all smart cards, wherein each group of subscribers receives a false service key $P_F$. The pirate will distribute the false service key which identifies the group to which the cracked smart card belongs. Within this group in a further step the cracked smart card can be located by distributing within the group a further set of false keys.

In the embodiments described the conditional access module 11 and the secure device 12 are shown as physically separate devices. It will be understood that the conditional access module and/or the secure device can also be part of the terminal 10 or implemented in the terminal 10 by suitable programming. Therefore, the terms conditional access module 11 and secure device 12 as used in the specification and claims are not restricted to physically separate parts.

The invention is not restricted to the above-described embodiments which can be varied in a number of ways within the scope of the claims.

The invention claimed is:

1. Method for operating a conditional access system for broadcast applications, said conditional access system comprising a number of subscribers, each subscriber having a terminal including a conditional access module and a secure device to store entitlements, wherein a source signal is encrypted using a first key ($C_W$), said first key ($C_W$) being changed at a high rate, said encrypted source signal being broadcasted for receipt by the terminals, wherein entitlement control messages (ECM's) are sent to the secure devices, said ECM's comprising the first keys ($C_W$) encrypted using a service key ($P_T$), wherein entitlement management messages (EMM's) are sent to the secure device providing the service key ($P_T$) required to decrypt encrypted first keys ($C_W$), wherein a cracked secure device which is used in an unauthorized manner is traced by sending different keys required to obtain the first keys to different terminals or groups of terminals and monitoring the key information provided by a pirate, wherein search EMM's are sent to at least a part of the terminals, said search EMM's providing at least the service key ($P_T$) and a dummy key ($P_{D1}$ or $P_{D2}$), at least the search EMM's comprising identifiers identifying the keys ($P_T$ and $P_{D1}$ or $P_{D2}$), wherein first search EMM's with the keys ($P_T$ and $P_{D1}$) are sent to a first part of the terminals and second search EMM's with the keys ($P_T$ and $P_{D2}$) are sent to a second part of the terminals, wherein an ECM identifying the service key ($P_T$) to be used to decrypt the encrypted first key ($C_W$), is sent to all secure devices just before the first key ($C_W$) is needed to decrypt the source signal.

2. Method according to claim 1, wherein the encrypted source signal comprises a stream of data packets, wherein successive groups including at least one data packet, are encrypted using successive first keys($C_{W1}$, $C_{W2}$, . . . , $C_{Wi}$, . . . , $C_{Wn}$), each data packet having a flag indicating the first key ($C_{Wi}$) to be used for decrypting the data packet, wherein in stead of an ECM identifying the service key ($P_T$) an ECM identifying a dummy key ($P_{D1}$ or $P_{D2}$) to be used to decrypt a next encrypted first key ($C_{Wi}$), is sent to the secure devices of the first and second parts of the terminals, respectively, just before the first key ($C_{Wi}$) is needed to decrypt the source signal, whereas the data packet is encrypted using the previous first key($C_{Wi-1}$).

3. Method according to claim 1, wherein a set of search EMM's is sent to the terminals, each search EMM providing two keys ($P_T$ and $P_{D1}$, $P_T$ and $P_{D2}$, . . . , $P_T$ and $P_{Dn}$).

4. Method according to claim 3, wherein the terminals are divided into groups, wherein in a first search step the number of search EMM's of the set of search EMM's corresponds to the number of groups.

5. A method according to claim 1, wherein the distribution of the terminals in groups of terminals is varied to trace the cracked secure device.

6. A method for operating a conditional access system for broadcast applications, said conditional access system comprising a number of subscribers, each subscriber having a terminal including a conditional access module and a secure device to store entitlements, wherein a source signal is encrypted using a first key ($C_W$), said first key ($C_W$) being changed at a rate, said encrypted source signal being broadcasted for receipt by the terminals, wherein entitlement control messages (ECMs) are sent to the secure devices, said ECMs comprising the first keys ($C_W$) encrypted using a service key ($P_T$), wherein entitlement management messages (EMMs) are sent to the secure device providing the service key ($P_T$) required to decrypt encrypted first keys ($C_W$), wherein a cracked secure device which is used in an unauthorized manner is traced by sending different keys to different terminals or groups of terminals and monitoring the key information provided by a pirate, wherein a set of search EMMs is sent to at least a part of the terminals, each search EMM of the set comprising a different dummy key ($P_D$), each of the dummy keys ($P_D$) being a key other than a correct service key ($P_T$) for decrypting an encrypted first key ($C_W$), and each search EMM being sent to a different terminal or group of terminals.

7. A method according to claim 6, wherein the distribution of the terminals in groups of terminals is varied to trace the cracked secure device.

* * * * *

UNITED STATES PATENT AND TRADEMARK OFFICE
CERTIFICATE OF CORRECTION

PATENT NO. : 7,155,611 B2
APPLICATION NO. : 09/914258
DATED : December 26, 2006
INVENTOR(S) : Wajs et al.

It is certified that error appears in the above-identified patent and that said Letters Patent is hereby corrected as shown below:

On the Title page, in field (86), in column 1, line 3, delete "Feb. 8, 2002" and insert -- Aug. 21, 2001 --, therefor.

On the Title page, in field (57), under "Abstract", in column 2, line 24, after "terminals" insert -- . --.

In column 2, line 53, delete "$C_{Wn}$) ," and insert -- $C_{Wn}$), --, therefor.

In column 2, line 57, delete "($C_{Wi}$) ," and insert -- ($C_{Wi}$), --, therefor.

In column 2, line 61, after "($C_{Wi-1}$)" insert -- . --.

In column 5, line 26, after "disclosure" insert -- , --.

In column 5, line 30, delete "Pi" and insert -- $P_I$ --, therefor.

In column 5, line 33, delete "Pi" and insert -- $P_1$ --, therefor.

In column 5, line 37, delete "Cw" and insert -- $C_W$ --, therefor.

In column 5, line 37, delete "Ci" and insert -- $C_i$ --, therefor.

In column 6, line 8, in Claim 1, delete "Method" and insert -- A method --, therofor.

In column 6, line 14, in Claim 1, after "a" delete "high".

In column 6, line 37, in Claim 2, delete "Method" and insert -- A method --, therefor.

In column 6, line 40, in Claim 2, delete "keys" and insert -- key --, therefor.

In column 6, line 44, in Claim 2, after "used" insert -- , --.

In column 6, line 50, in Claim 3, delete "Method" and insert -- A method --, therefor.

UNITED STATES PATENT AND TRADEMARK OFFICE
CERTIFICATE OF CORRECTION

PATENT NO. : 7,155,611 B2
APPLICATION NO. : 09/914258
DATED : December 26, 2006
INVENTOR(S) : Wajs et al.

It is certified that error appears in the above-identified patent and that said Letters Patent is hereby corrected as shown below:

In column 6, line 53, in Claim 4, delete "Method" and insert -- A method --, therefor.

Signed and Sealed this

Twenty-fourth Day of July, 2007

JON W. DUDAS
*Director of the United States Patent and Trademark Office*